United States Statutory Invention Registration [19]

[11] Reg. Number: H161

Sullivan, Jr. [43] Published: Nov. 4, 1986

[54] SMALL FUEL-AIR EXPLOSIVE BOTTLE

[75] Inventor: John D. Sullivan, Jr., Edgewood, Md.

[73] Assignee: The United States of America as represenetd by the Secretary of the Army, Washington, D.C.

[21] Appl. No.: 825,422

[22] Filed: Feb. 3, 1986

[51] Int. Cl.[4] ..... F42B 25/12

[52] U.S. Cl. ..... 102/363; 102/331

*Primary Examiner*—Harold J. Tudor

*Attorney, Agent, or Firm*—Anthony T. Lane; Harold H. Card, Jr.; Michael C. Sachs

[57] ABSTRACT

The invention comprises a plastic bottle having a threaded cap with a hole in its center and two hollow plastic tubes having the same diameter. One of the hollow tubes is empty and is used to seal the device in transit. The other hollow tube is filled with an explosive fluid and capped with a detonator with wires that connect to a power source. The device is designed to create a volatile mist of air and combustible fluid by dispersing the combustible fluid by means of an explosive charge. The explosive charge is made up of an explosive fluid and is an integral part of the device. The device can be manufactured from commercially available, inexpensive materials and requires no skill or tools. The device can be safely operated. It is made entirely of plastic materials; there is no metal which may fragment. This device is the smallest to be successfully tested to achieve an unconfined fuel-air explosion; it requires approximately one-half the amount of combustible fluid as similar devices to create the same desired result.

6 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SMALL FUEL-AIR EXPLOSIVE BOTTLE

GOVERNMENTAL INTEREST

The invention described herein may be manufactured, used, and licensed by or for the Government for Governmental purposes without the payment to me of any royalties thereon.

BACKGROUND OF THE INVENTION

The present invention deals with a means of providing a combustible fuel-air dispersion.

Some difficulties associated with combustible fuel-air dispersion devices include a construction from metal or from a combination of metal and plastic which requires tedious machine shop work for manufacture and assembly.

One object of this invention is to provide an extremely small liquid fuel bottle; the bottle can hold 264 ml of liquid fuel, believed to be the smallest ever used to create an unconfined fuel-air explosion. Such a device has successfully performed using an amount of combustible fluid approximately one-half the required volume previously expected. A construction of this invention, devoid of metal, eliminates the danger of fragmentation, a considerable hazard. A second feature is the ability to dispose only a small amount of noncombustible agent, or subsequent gross explosion, or ignition of the air-suspended mixture of combustible agent.

SUMMARY AND OBJECTS OF THE INVENTION

The invention comprises a plastic bottle having a threaded cap with a hole in its center. A hollow plastic tube, closed at one end and having a flange lip at the other end, is inserted into the neck of the bottle and the cap fastened tightly; thus preventing spillage in transit. To activate the device, the hollow empty tube is removed and replaced with a tube of identical diameter but containing an explosive fluid. The purpose of having two hollow tubes, one empty, are several. The hollow tube displaces just the right amount of the bottle's contents, which prevents sloshing in transit, and excludes air from the bottle, which gives it fire resistance. There is safety with two tubes because the exchange is performed at the time when the device is about to be activated. Without the active hollow tube, the device cannot function. The exchange also speeds up the setup and prevents fumbling by the operator because the second hollow tube has already been filled and stored beforehand. Finally, the purpose of the flanged lip of the tubes is that the lip secures the hollow tube in the bottle when the cap is screwed on thus making it spillproof. The lip also accurately positions the tube along the center axis of the bottle and the centering improves the dispersion of the bottle's contents. A detonator, having attached to it electrical wires, is inserted into the open end of the tube. The wires pass through the hole in the cap and attach to a standard power source which ignites the explosive fluid. The ensuing explosion then causes the flammable fluid contained in the bottle to disperse. The dispersed combustible fluid forms a combustible air-fluid mist which can then be detonated.

Accordingly, one object of this invention is to provide an extremely small size liquid fuel bottle for use in combustible fuel-air dispersion devices.

Another object is to provide a non-metallic fuel bottle for use in a combustible fuel-air dispersion device, to avoid the dangers of fragmentation.

A still further object of the invention is to provide a small liquid fuel bottle for use in combustible fuel-air dispersion devices which can be constructed without the necessity for the custom machining of parts therefor.

Still other objects and advantages of the invention will become apparent to those skilled in the art from a reading of the attached specification and drawings.

BRIEF DESCRIPTION OF FIGURES IN DRAWINGS

DESCRIPTION OF THE INVENTION

Figure 1:
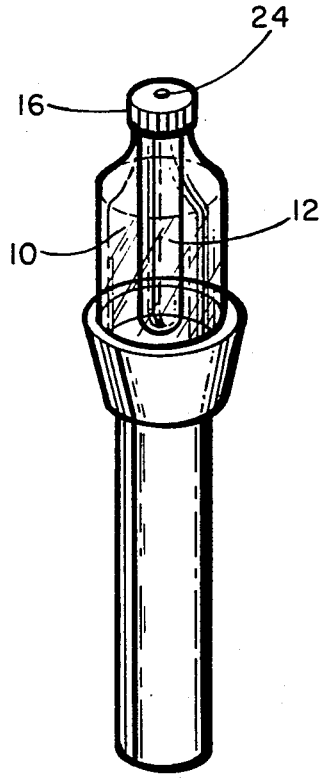
FIG. 1 is a side view of a small fuel-air combustible fluid bottle according to this invention.
Figure 2:
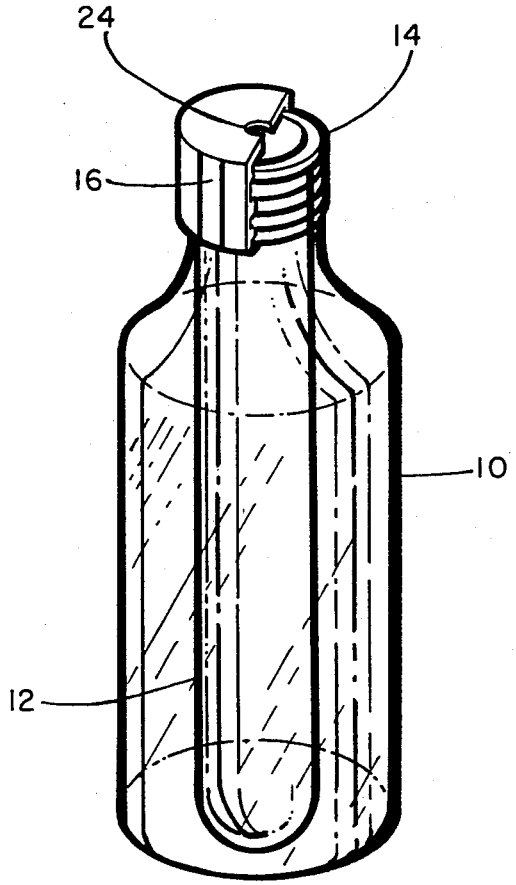
FIG. 2 and FIG. 3 are additional views of the small fuel-air combustible fluid bottle in FIG. 1.
Figure 3:
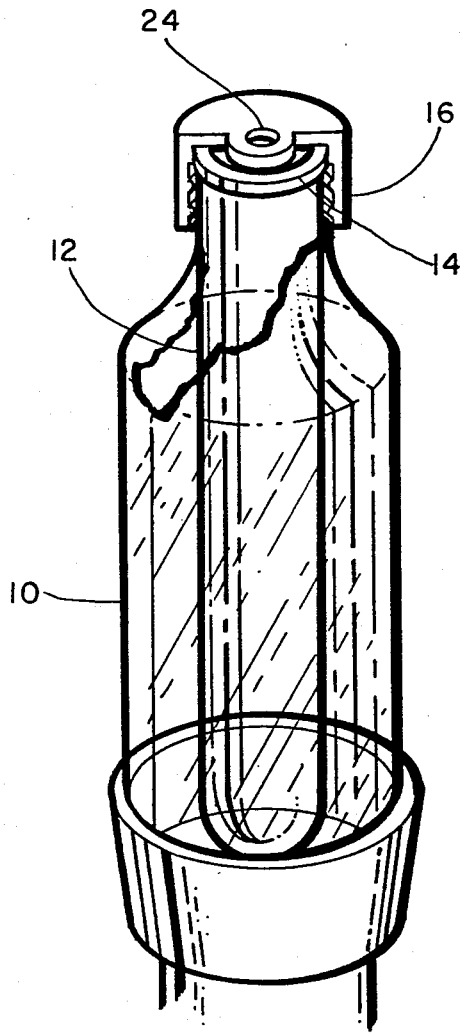
Figure 4:
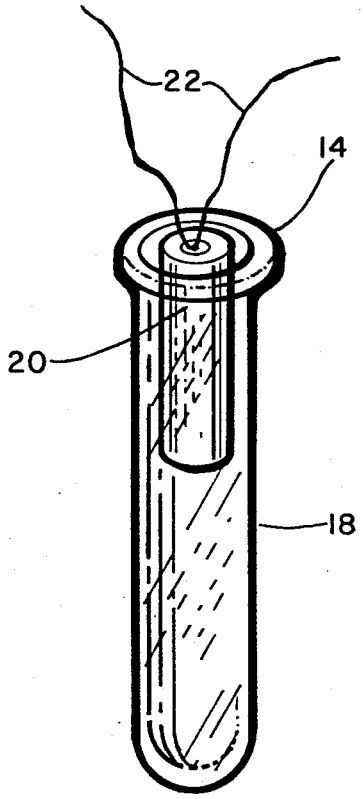
FIG. 4 is a side view of the detonator assembly of a tube containing explosive fluid for use in this invention.
Figure 5:
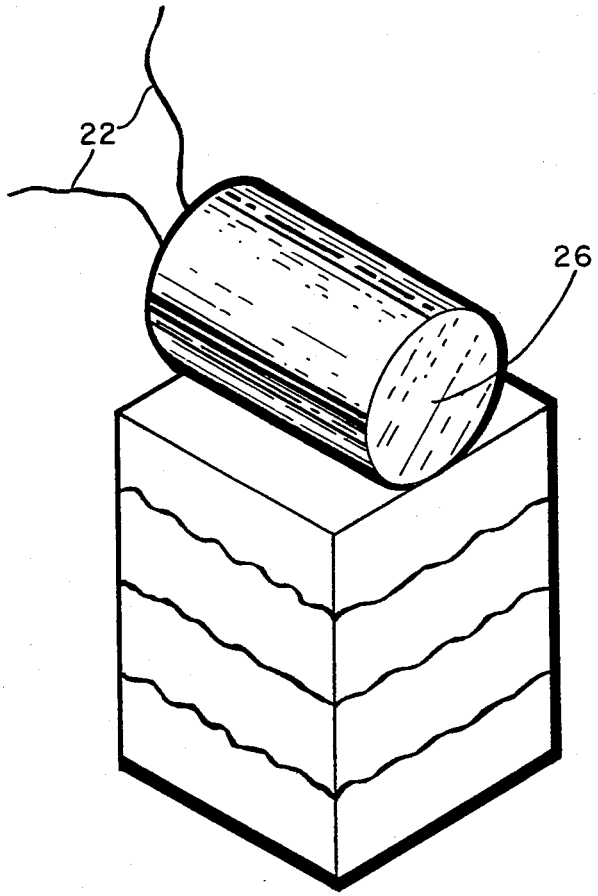
FIG. 5 is a side view of a second detonator assembly which can be used to ignite a dispersed fluid-air mist as used according to this invention.

As shown in FIG. 1, and also detailed in FIGS. 2 and 3, a small fuel-air explosive bottle (10) is filled with a combustible fluid. A first hollow tube (12), closed at one end and flanged at the other, is inserted into the neck of the bottle (10) so that the flanged end (14) rests on the neck of the bottle, as shown in FIGS. 1 and 4. A threaded cap (16) is then fastened tightly to prevent spillage of the combustible fluid in transit. To operate the device, the first hollow tube (12) is removed and replaced by a second hollow tube of identical diameter (18) containing an explosive fluid as shown in FIG. 4. The second hollow filled tube (18) has inserted into its open end an electric detonator (20) connected to two electrical wires (22). The wires pass through an aperture (24) as shown in FIG. 1 and are connected to any standard source of electricity (battery, etc.) not shown in the drawings. The detonation of the explosive fluid contained in this second tube results in the rupture of the bottle and the dispersion of the flammable fluid into an air-fuel conbustible mist. This mist can then be subsequently ignited by another electrically activated detonator (26) mounted on a support surface (28) as shown in FIG. 5.

In this invention, a smaller size container for fuel-air munition dispersal and detonation has been shown than has been successfully known or tested previously. The smallest known such device previously successfully tested required almost twice as much combustible fluid, was made of metal, and required special tooling and fabrication. This invention, by contrast, is made entirely of plastic eliminating special fabrication, and it can also be detonated without the threat of metallic debris owing to the materials, and in a manner where the initial explosive dispersion is remotely located with respect to the point of ignition of the homogeneous explosive cloud. In addition to the economics of manufacture, the invention permits additional control over operation, visible liquid level, easy scoring of bottle, safe assembly, scaled down testing of expensive chemicals, and a much smaller blast area, for example.

Accordingly, while there has been shown and described a preferred embodiment or embodiments of the present invention, it will be understood that the invention may be embodied otherwise than as herein specifically illustrated or described and that within said embodiments certain changes in detail and construction, and the form of arrangement of the parts may be made without departing from the underlying idea or principles of this invention within the spirit and scope of the invention and appended claims.

What is claimed is:

1. An apparatus for dispersing combustible fluids comprising:

(a) a bottle filled with combustible fluid having a threaded opening at the top;

(b) a first closed ended hollow tube inserted through said threaded opening of the bottle;

(c) a second closed ended hollow tube of the same diameter as said first hollow tube containing an explosive fluid to disperse the combustible fluid in said bottle;

(d) detonator inserted into the top of said hollow tube for igniting the said explosive fluid;

(e) means for igniting said explosive fluid contained in said second hollow tube to disperse said combustible fuel; and (f) means for igniting said dispersed combustible air-fuel.

2. An apparatus as defined in claim 1 wherein said bottle containing said combustible fluid is made of propylene plastic.

3. An apparatus as defined in claim 1 wherein said hollow tubes are made of propylene plastic.

4. An apparatus as defined in claim 3 wherein said hollow tubes have a flanged lip at their open ends to secure said tubes in the neck of the bottle.

5. An apparatus as defined in claim 1 wherein said threaded cap has an aperture to allow access to said detonator, and said detonator has electric wires for connection to a power source.

6. A method of igniting combustible fluid contained in a combustible fuel bottle which has a first and second respective hollow tube, comprising the steps of:

(a) removing the said first hollow tube from said bottle;

(b) inserting the second hollow tube into said bottle;

(c) dispersing combustible fluid into an air-fuel mist;

(d) detonating the air-fuel mist remotely.

* * * * *